US010129365B2

(12) United States Patent
Silberstein et al.

(10) Patent No.: US 10,129,365 B2
(45) Date of Patent: Nov. 13, 2018

(54) METHOD AND APPARATUS FOR PRE-FETCHING REMOTE CONTENT BASED ON STATIC AND DYNAMIC RECOMMENDATIONS

(71) Applicant: CISCO TECHNOLOGY, INC., San Jose, CA (US)

(72) Inventors: Rebecca Lynn Braynard Silberstein, Sunnyvale, CA (US); Michael F. Plass, Mountain View, CA (US); Roger C. Meike, Emerald Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 518 days.

(21) Appl. No.: 14/079,423

(22) Filed: Nov. 13, 2013

(65) Prior Publication Data

US 2015/0134781 A1    May 14, 2015

(51) Int. Cl.
*H04L 29/06* (2006.01)
*H04L 29/08* (2006.01)
*G06F 17/30* (2006.01)

(52) U.S. Cl.
CPC .... *H04L 67/2857* (2013.01); *G06F 17/30781* (2013.01); *G06F 17/30902* (2013.01)

(58) Field of Classification Search
CPC . H04L 67/02; H04L 67/2847; H04L 67/2857; G06F 17/30902; G06F 17/30781; G06F 17/30899
USPC ....... 709/203, 219, 226, 232, 204, 223, 225; 370/254, 392, 395.1
See application file for complete search history.

(56) References Cited

U.S. PATENT DOCUMENTS

| 817,441 A | 4/1906 | Niesz |
| 4,309,569 A | 1/1982 | Merkle |
| 4,921,898 A | 5/1990 | Lenney |

(Continued)

FOREIGN PATENT DOCUMENTS

| DE | 1720277 A1 | 6/1967 |
| DE | 19620817 A1 | 11/1997 |

(Continued)

OTHER PUBLICATIONS

"Protocol Considerations for a Prefix-Caching Proxy for Multimedia Streams"—Gruber et al, AT&T Labs—Research May 2010 http://citeseerx.ist.psu.edu/viewdoc/download?doi=10.1.1.40.5859&rep=rep1&type=pdf.*

(Continued)

*Primary Examiner* — Randy A Scott

(57) ABSTRACT

A data-caching system facilitates pre-loading a cache with content objects that are likely to be of interest to a client device, as determined based on their correlation to other content objects served to the client device. During operation, the system can receive an interest for a content object, and can determine whether the local network device can satisfy the interest. If so, the system generates a content-object recommendation that indicates other content objects that are correlated with the received interest, for example, by computing correlation values between the received interest and a plurality of historical interests. The system then provides the content recommendation to a remote network device from which the interest originated, such that the content recommendation indicates the correlated content objects to pre-load into a cache.

19 Claims, 10 Drawing Sheets

(56) References Cited

U.S. PATENT DOCUMENTS

| | | | |
|---|---|---|---|
| 5,070,134 A | 12/1991 | Oyamada | |
| 5,110,856 A | 5/1992 | Oyamada | |
| 5,506,844 A | 4/1996 | Rao | |
| 5,629,370 A | 5/1997 | Freidzon | |
| 5,870,605 A | 2/1999 | Bracho | |
| 6,023,726 A | 2/2000 | Saksena | |
| 6,052,683 A | 4/2000 | Irwin | |
| 6,091,724 A | 7/2000 | Chandra | |
| 6,173,364 B1 | 1/2001 | Zenchelsky | |
| 6,182,133 B1* | 1/2001 | Horvitz | G06F 17/30902 707/999.008 |
| 6,226,618 B1 | 5/2001 | Downs | |
| 6,233,646 B1 | 5/2001 | Hahm | |
| 6,332,158 B1 | 12/2001 | Risley | |
| 6,366,947 B1* | 4/2002 | Kavner | G06F 17/30902 707/E17.12 |
| 6,366,988 B1 | 4/2002 | Skiba | |
| 6,574,377 B1 | 6/2003 | Cahill | |
| 6,654,792 B1 | 11/2003 | Verma | |
| 6,667,957 B1 | 12/2003 | Corson | |
| 6,681,220 B1 | 1/2004 | Kaplan | |
| 6,681,326 B2 | 1/2004 | Son | |
| 6,769,066 B1 | 7/2004 | Botros | |
| 6,772,333 B1 | 8/2004 | Brendel | |
| 6,862,280 B1 | 3/2005 | Bertagna | |
| 6,901,452 B1 | 5/2005 | Bertagna | |
| 6,917,985 B2 | 7/2005 | Madruga | |
| 6,968,393 B1 | 11/2005 | Chen | |
| 6,981,029 B1 | 12/2005 | Menditto | |
| 7,013,389 B1 | 3/2006 | Srivastava | |
| 7,031,308 B2 | 4/2006 | Garcia-Luna-Aceves | |
| 7,061,877 B1 | 6/2006 | Gummalla | |
| 7,206,860 B2 | 4/2007 | Murakami | |
| 7,257,837 B2 | 8/2007 | Xu | |
| 7,287,275 B2 | 10/2007 | Moskowitz | |
| 7,315,541 B1 | 1/2008 | Housel | |
| 7,339,929 B2 | 3/2008 | Zelig | |
| 7,350,229 B1 | 3/2008 | Lander | |
| 7,382,787 B1 | 6/2008 | Barnes | |
| 7,426,696 B1* | 9/2008 | Hwang | H04N 5/44543 348/E5.105 |
| 7,444,251 B2 | 10/2008 | Nikovski | |
| 7,466,703 B1 | 12/2008 | Arunachalam | |
| 7,472,422 B1 | 12/2008 | Agbabian | |
| 7,496,668 B2 | 2/2009 | Hawkinson | |
| 7,509,425 B1 | 3/2009 | Rosenberg | |
| 7,523,016 B1 | 4/2009 | Surdulescu | |
| 7,543,064 B2 | 6/2009 | Juncker | |
| 7,552,233 B2 | 6/2009 | Raju | |
| 7,555,482 B2 | 6/2009 | Korkus | |
| 7,555,563 B2 | 6/2009 | Ott | |
| 7,567,547 B2 | 7/2009 | Mosko | |
| 7,567,946 B2 | 7/2009 | Andreoli | |
| 7,580,971 B1 | 8/2009 | Gollapudi | |
| 7,623,535 B2 | 11/2009 | Guichard | |
| 7,647,507 B1 | 1/2010 | Feng | |
| 7,660,324 B2 | 2/2010 | Oguchi | |
| 7,685,290 B2 | 3/2010 | Satapati | |
| 7,698,463 B2 | 4/2010 | Ogier | |
| 7,720,933 B2* | 5/2010 | Gordon | H04L 67/104 709/217 |
| 7,747,749 B1* | 6/2010 | Erikson | G06F 17/30902 709/219 |
| 7,769,887 B1 | 8/2010 | Bhattacharyya | |
| 7,779,467 B2 | 8/2010 | Choi | |
| 7,801,177 B2 | 9/2010 | Luss | |
| 7,814,425 B1* | 10/2010 | O'Shaugnessy | G06Q 10/107 715/752 |
| 7,816,441 B2 | 10/2010 | Elizalde | |
| 7,831,733 B2 | 11/2010 | Sultan | |
| 7,908,337 B2 | 3/2011 | Garcia-Luna-Aceves | |
| 7,924,837 B1 | 4/2011 | Shabtay | |
| 7,953,885 B1 | 5/2011 | Devireddy | |
| 8,000,267 B2 | 8/2011 | Solis | |
| 8,010,691 B2 | 8/2011 | Kollmansberger | |
| 8,074,289 B1 | 12/2011 | Carpentier | |
| 8,117,441 B2 | 2/2012 | Kurien | |
| 8,160,069 B2 | 4/2012 | Jacobson | |
| 8,204,060 B2 | 6/2012 | Jacobson | |
| 8,214,364 B2 | 7/2012 | Bigus | |
| 8,224,985 B2 | 7/2012 | Takeda | |
| 8,225,057 B1 | 7/2012 | Zheng | |
| 8,271,578 B2 | 9/2012 | Sheffi | |
| 8,312,064 B1 | 11/2012 | Gauvin | |
| 8,386,622 B2 | 2/2013 | Jacobson | |
| 8,467,297 B2 | 6/2013 | Liu | |
| 8,553,562 B2 | 10/2013 | Allan | |
| 8,572,214 B2 | 10/2013 | Garcia-Luna-Aceves | |
| 8,654,649 B2 | 2/2014 | Vasseur | |
| 8,665,757 B2 | 3/2014 | Kling | |
| 8,667,172 B2 | 3/2014 | Ravindran | |
| 8,688,619 B1 | 4/2014 | Ezick | |
| 8,688,727 B1* | 4/2014 | Das | G06F 17/30528 707/748 |
| 8,699,350 B1 | 4/2014 | Kumar | |
| 8,750,820 B2 | 6/2014 | Allan | |
| 8,761,022 B2 | 6/2014 | Chiabaut | |
| 8,762,477 B2 | 6/2014 | Xie | |
| 8,762,570 B2 | 6/2014 | Qian | |
| 8,762,707 B2 | 6/2014 | Killian | |
| 8,767,627 B2 | 7/2014 | Ezure | |
| 8,817,594 B2 | 8/2014 | Gero | |
| 8,826,381 B2 | 9/2014 | Kim | |
| 8,832,302 B1 | 9/2014 | Bradford | |
| 8,836,536 B2 | 9/2014 | Marwah | |
| 8,862,774 B2 | 10/2014 | Vasseur | |
| 8,903,756 B2 | 12/2014 | Zhao | |
| 8,937,865 B1 | 1/2015 | Kumar | |
| 9,071,498 B2 | 6/2015 | Beser | |
| 9,112,895 B1 | 8/2015 | Lin | |
| 2001/0051927 A1* | 12/2001 | London | H04L 29/06 705/51 |
| 2002/0010795 A1 | 1/2002 | Brown | |
| 2002/0048269 A1 | 4/2002 | Hong | |
| 2002/0054593 A1 | 5/2002 | Morohashi | |
| 2002/0077988 A1 | 6/2002 | Sasaki | |
| 2002/0078066 A1 | 6/2002 | Robinson | |
| 2002/0138551 A1 | 9/2002 | Erickson | |
| 2002/0176404 A1 | 11/2002 | Girard | |
| 2002/0188605 A1 | 12/2002 | Adya | |
| 2002/0199014 A1 | 12/2002 | Yang | |
| 2003/0046437 A1 | 3/2003 | Eytchison | |
| 2003/0048793 A1 | 3/2003 | Pochon | |
| 2003/0051100 A1 | 3/2003 | Patel | |
| 2003/0074472 A1 | 4/2003 | Lucco | |
| 2003/0097447 A1 | 5/2003 | Johnston | |
| 2003/0140257 A1 | 7/2003 | Paterka | |
| 2004/0024879 A1 | 2/2004 | Dingman | |
| 2004/0030602 A1 | 2/2004 | Rosenquist | |
| 2004/0049541 A1* | 3/2004 | Swahn | G06F 3/04817 709/203 |
| 2004/0073715 A1 | 4/2004 | Folkes | |
| 2004/0139230 A1 | 7/2004 | Kim | |
| 2004/0221047 A1 | 11/2004 | Grover | |
| 2004/0225627 A1 | 11/2004 | Botros | |
| 2004/0252683 A1 | 12/2004 | Kennedy | |
| 2005/0003832 A1 | 1/2005 | Osafune | |
| 2005/0028156 A1 | 2/2005 | Hammond | |
| 2005/0043060 A1 | 2/2005 | Brandenberg | |
| 2005/0050211 A1 | 3/2005 | Kaul | |
| 2005/0074001 A1 | 4/2005 | Mattes | |
| 2005/0149508 A1 | 7/2005 | Deshpande | |
| 2005/0159823 A1 | 7/2005 | Hayes | |
| 2005/0198351 A1 | 9/2005 | Nog | |
| 2005/0249196 A1 | 11/2005 | Ansari | |
| 2005/0259637 A1 | 11/2005 | Chu | |
| 2005/0262217 A1 | 11/2005 | Nonaka | |
| 2005/0289222 A1 | 12/2005 | Sahim | |
| 2006/0010249 A1 | 1/2006 | Sabesan | |
| 2006/0029102 A1 | 2/2006 | Abe | |
| 2006/0039379 A1 | 2/2006 | Abe | |
| 2006/0051055 A1 | 3/2006 | Ohkawa | |
| 2006/0072523 A1 | 4/2006 | Richardson | |

(56) References Cited

U.S. PATENT DOCUMENTS

| | | |
|---|---|---|
| 2006/0089157 A1* | 4/2006 | Casey .................. H04L 67/04 455/456.3 |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1* | 10/2007 | Ott .................. H04L 29/06 709/242 |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082509 A1* | 4/2008 | Bessieres .......... G06F 17/30899 |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0244460 A1* | 10/2008 | Louch .................. G06F 3/04812 715/711 |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0112975 A1 | 4/2009 | Beckman et al. |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0066727 A1 | 3/2012 | Nozoe |
| 2012/0106339 A1 | 5/2012 | Mishra |
| 2012/0114313 A1 | 5/2012 | Phillips |

(56) References Cited

U.S. PATENT DOCUMENTS

| | | |
|---|---|---|
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1* | 3/2013 | Huh .............. H04L 63/065 726/3 |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi et al. |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1* | 8/2013 | Qian .............. H04L 67/327 709/241 |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2013/0346877 A1* | 12/2013 | Borovoy .............. H04L 65/403 715/753 |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0114904 A1* | 4/2014 | Choo .............. G06Q 50/22 706/50 |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 1111517 B1 | 8/2006 |
| EP | 2124415 A2 | 11/2009 |
| EP | 2214357 A1 | 8/2010 |
| EP | 2555128 A1 | 2/2013 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Jacobson, Van et al. 'VoCCN: Voice Over Content-Centric Networks.' Dec. 1, 2009. ACM ReArch'09.

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

(56) References Cited

OTHER PUBLICATIONS

"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.

Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

(56) References Cited

OTHER PUBLICATIONS

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 3, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Sep. 3, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.

(56) References Cited

OTHER PUBLICATIONS

Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Extended European Search Report in counterpart European Application No. 14191908.4, dated Mar. 24, 2015, 9 pages.
Bellante, et al., "On Netflix Catalog Dynamics and Caching Performance," 2013 IEEE 18th International Workshop on Computer Aided Modeling and Design of Communication Links and Networks (CAMAD), Sep. 2013, 5 pages.
Brampton, et al., "Characterizing and Exploiting Workloads of Highly Interactive Video-on-Demand," Multimedia Systems, vol. 15, Issue 1, Feb. 2009, 17 pages.
Awiphan, et al., "Video Streaming over Content Centric Networking: Experimental Studies on PlanetLab," 2013 Computing, Communications and IT Applications Conference (ComComAp), Apr. 2013, 6 pages.
Jacobson, et al., "Networking Named Content," CoNEXT' 09, Proceedings of the 5th International Conference on Emerging Networking Experiments and Technologies, Dec. 2009, 12 pages.

* cited by examiner

METHOD AND APPARATUS FOR PRE-FETCHING REMOTE CONTENT BASED ON STATIC AND DYNAMIC RECOMMENDATIONS

BACKGROUND

Field

This disclosure is generally related to pre-loading a content cache. More specifically, this disclosure is related to generating a recommendation of content objects to pre-load into the content cache, based on their correlation to content objects being requested by one or more client devices.

Related Art

Advances in cloud computing are making it easier and less expensive to provide online content to a plurality of client devices across the Internet. This online content can include executable instructions and data that implement a web-based service and/or can include a media stream that may require a high data bandwidth. A system administrator or service provider may deploy a set of web servers to host the online content, and may deploy a plurality of cache servers across a plurality of geographic locations to serve the content to the client devices. As more users sign up with the online service, the system administrator can deploy additional cache servers to improve performance to the client devices.

However, cache servers are oftentimes designed to cache only data that is most-frequently or most recently requested by the client devices. This improves the request response time for popular data, which makes the web service responsive to requests from most client devices. Unfortunately, when a client device issues a request for unpopular data, it is likely that this unpopular data has not been cached at a cache server, which can result in an undesirably long request response time. For example, a movie-streaming service may store popular movies on various cache servers, which allows the movie-streaming service to provide the movie to client devices in a high-definition format. However, if a user desires to watch a movie that is not currently popular, the movie-streaming service may need to service this movie directly from a server configured to handle unpopular content or a slower machine with direct access to the full content catalogue. The streaming performance from the media-storage server to the client device may be inferior to that from a cache server, which can result in buffering issues during content playback, or may require the media-storage server to stream a lower-resolution version of the media stream.

SUMMARY

One embodiment provides a data-caching system that facilitates pre-loading a cache with content objects that have been determined to be correlated with other content objects. During operation, the system can receive an interest for a content object, such as from a remote client device, a data-caching repository, or a local software application. The system then determines whether the local network device satisfies the interest. If the system does not satisfy the interest, either because the system does not store the content item or is not along a path to a remote network device that satisfies the interest, the system ignores the interest. However, if the system can satisfy the interest, the system generates a content-object recommendation by determining one or more other content objects which are correlated with the received interest. The content recommendation indicates the one or more other content objects, and facilitates pre-populating a cache with the correlated content objects. The system can provide the content recommendation to a remote network device from which the interest originated. The system may additionally correlate interests for content over time and between different originating requestors.

In some embodiments, the interest corresponds to data presented in an interactive menu or catalogue, on a web page, by a software application, or by any other device or system designed to present digital content to a user.

In some embodiments, the content recommendation indicates a content object obtainable by following a link on the interactive menu or catalogue, web page, or application.

In some embodiments, the system may select correlated content based on one or more types of metadata, such as to select a sequential or increasing version of a content object, or to select a content object of an increasing segmentation number. For example, the system can receive a content object that is associated with a data collection or data stream. The system can analyze the content object to identify a naming convention associated with the data collection or data stream, and derives location-independent names for one or more other content objects in the data collection based on the received content object's name. The system can pre-cache other content objects in the collection or data stream by disseminating interests for one or more of the derived names, and caching any content object that the system receives that satisfies a derived name. The system can also generate a content recommendation that indicates one or more of the derived names, which facilitates sending this recommendation to a local application or to a remote device that needs to pre-cache content objects in the data collection or data stream.

In some embodiments, the system periodically analyzes historical interests, corresponding to a set of content objects requested by a plurality of client devices, to compute a correlation value between pairs of content objects in the set.

In some embodiments, while determining the one or more other content objects correlated with the received interest, the system selects a subset of content objects, from the set of content objects that have a correlation value greater than or equal to a threshold correlation value.

In some embodiments, the system determines that the local network device satisfies the interest by determining that the local network device stores the content object that satisfies the interest, and/or by determining that the local network device is along a network path to a remote network device that satisfies the interest.

In some embodiments, while providing the content recommendation to the remote network device, the system can obtain the content object that satisfies the received interest, and encapsulates the content recommendation with the content object. For example, the system can append or prepend the recommendation to the content object to create an encapsulated content object. The system then sends the encapsulated content object to an interface associated with the interest to satisfy the interest.

In some embodiments, while providing the content recommendation to the remote network device, the system can receive a recommendation-requesting interest for the content recommendation corresponding to the content item. The system then sends the content recommendation to an interface associated with the interest to satisfy the recommendation-requesting interest.

One embodiment provides a data-caching system that pre-loads a cache with content objects that have been determined to be correlated with other content objects.

During operation, the system can disseminate a first interest for a first content object, and can obtain a content recommendation indicating at least a second content object correlated with the first content object. The system can also send a second interest for the second content object, and caches the second content object in a local repository or cache in response to receiving the second content object that satisfies the interest.

In some embodiments, the first interest corresponds to data presented on a web page, and the content recommendation indicates a content object obtainable by following a link on the web page, or by selecting a menu item of an interactive menu or catalogue.

In some embodiments, while obtaining the content recommendation, the system reads the content recommendation from the first content object.

In some embodiments, while obtaining the content recommendation, the system disseminates an interest for a recommendation indicating other content objects correlated with the first content object, and receives the content recommendation from a remote network device that satisfies the first interest for the first content object.

BRIEF DESCRIPTION OF THE FIGURES

In the figures, like reference numerals refer to the same figure elements.

DETAILED DESCRIPTION

Figure 1:
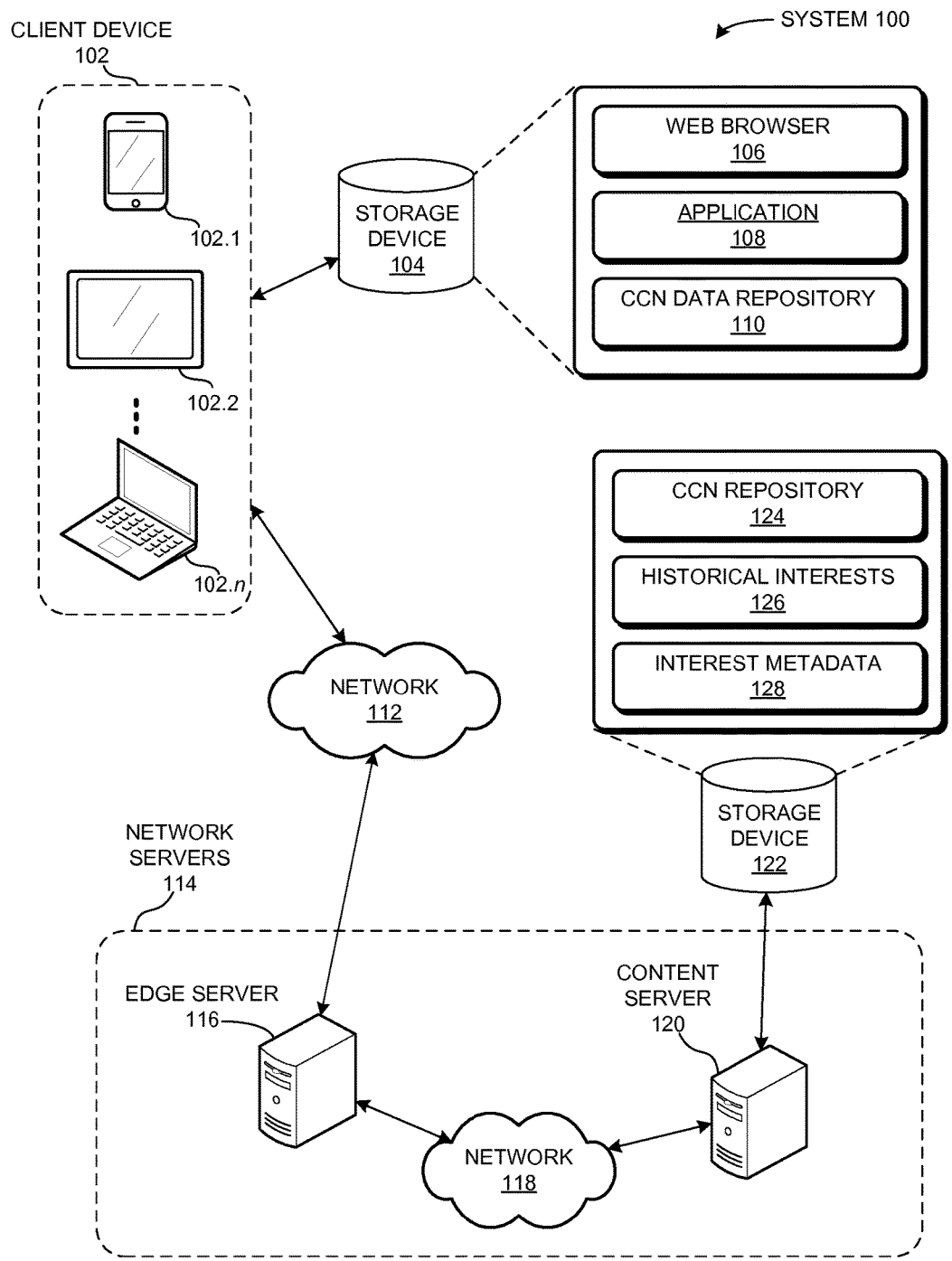
FIG. 1 illustrates an exemplary computer system that facilitates pre-loading a content-object cache in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a data-caching system that solves the problem of pre-populating a data cache at a client device, at a network's intermediate node (e.g., a cache server and/or content repository). For example, when a user browses a web page, the user's client device can request the contents of the web page from a content server, or from various intermediate nodes that cache the web page's data. The content server can include any network node that receives and satisfies requests for digital content. The intermediate node, on the other hand, can include any network node that caches digital content, forwards digital content along a network path, or performs other intermediate processing tasks on digital content. The data-caching system of the present invention allows the client device, or the intermediate node, to also receive a recommendation of other data items to pre-fetch for the user. These recommended data items can include data from other related web pages (e.g., data from other pages linked to by the current page), or data embedded in the current web page (e.g., a media stream, or code for an in-browser application).

In some embodiments, the intermediate node can receive the recommendation from the content server. For example, when the intermediate node (e.g., a server or other network node) receives a request for a data item from the client device, the intermediate node can request the recommendation from the system (or directly from a server) for other related data items, such as a video stream. Hence, the intermediate node can cache the related data before it receives a request for this data from a client device (e.g., before the user follows a hyperlink or menu item, or otherwise consumes the embedded content). Alternatively, the intermediate node can generate this recommendation locally, based on browsing habits from a plurality of client devices over time, and pre-fetches the additional data from the content server.

In some other embodiments, the client device can receive the recommendation from the intermediate node, which the client device uses to pre-fetch the related data before the user actually navigates to the related data. These recommended data items may include large pieces of data, such as a portion of a video stream, a large image file, or executable instructions. Pre-fetching this related data improves the browsing performance experienced by the user, as the data is readily available at the user's local computer.

The following terms describe elements of a content-centric networking (CCN) architecture:

Content Object: A single piece of named data, which is bound to a unique location-independent name. Content Objects are "persistent," which means that a Content Object can move around within a computing device, or across different computing devices, but does not change. If any component of the Content Object changes, the entity that made the change creates a new Content Object that includes the updated content, binds the new Content Object to a new unique location-independent name.

Location-independent Name: A location-independent name uniquely identifies a Content Object. A data-forwarding device can use the location-independent name to forward a packet toward a network node that generates or stores the Content Object, regardless of a network address or physical location for the Content Object. In some embodiments, the location-independent name can include a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, a structured name can follow a predetermined naming scheme. For example, the naming scheme may specify:

$$\text{``/DataClassification/DataType/UserName/Timestamp/digest''} \quad (1)$$

In naming scheme (1), "DataClassification" indicates a high level classification for a piece of data. Some examples could include "MyHealth" or "Personal Data." "DataType" can correspond to a high level description of the type of data being identified by the name, such as a weight measurement. "UserName" indicates a user identity, and may be a name or a unique identifier. "Timestamp" indicates a date and/or time when the piece of data was generated, such as when a weight measurement was taken. "Digest" indicates a unique identifier for the specific piece of data associated with the structured name. A description of techniques for generating a name for content is described in U.S. patent application Ser. No. 13/655,173 (entitled "GENERATING MEANINGFUL NAMES FOR CONTENT USING CONTEXTUAL AND IDENTIFYING INFORMATION," by inventors Rebecca Lynn Braynard Silberstein and Van L. Jacobson, filed 18 Oct. 2012), which is hereby incorporated by reference.

In some embodiments, the location-independent name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference.

Interest: A data object that indicates a request for a Content Object, and includes the location-independent name for the Content Object. A data consumer can disseminate an Interest across a named-data network, which CCN routers can propagate toward a storage device (e.g., a cache server) or a data producer that can provide the requested Content Object to satisfy the Interest. In a deployment utilizing in-network caching, the requested Content Object may be retrieved at any node in the path traversed by the Interest.

FIG. 1 illustrates an exemplary computer system 100 that facilitates pre-loading a content-object cache in accordance with an embodiment. Computer system 100 can include a computer network 112, which can include any wired or wireless network that interfaces various computing devices to each other, such as a computer network implemented via one or more technologies (e.g., Bluetooth, Wi-Fi, cellular, Ethernet, fiber-optic, etc.). Computer system 100 can also include a client device 102 and one or more network servers 114 coupled to network 112. Client device 102 can disseminate interests for obtaining data over network 112 from one or more network servers 114, such as to obtain data for a structured catalogue cached at an intermediate node 116 or stored at a content server 120.

Client device 102 can include any network-enabled electronic device, such as a smartphone or tablet 102.1, an Internet-enabled television 102.2, a computer 102.$n$ (e.g., a laptop, or a server computer), or any other electronic device or appliance. Client device 102 can include a storage device 104 that stores a CCN data repository 110 (e.g., a cache), which stores content objects that have been requested by client device 102, and/or content objects that may be of interest to client device 102 in the near future.

Storage device 104 can also include software applications that run on client device 102 to request and consume data via a network 112. For example, storage device 104 can include a web browser 106, or a native application 108, which a local user can operate to navigate through a content catalogue. The content catalogue may display a movie or video catalogue, a merchandise catalogue, or any other structured catalogue. Client device 102 can disseminate interests over network 112 to obtain data presented by the catalogue, such as a movie listing, a movie description, a movie preview, or the movie itself.

In some embodiments, CCN data repository 110 can store data objects that are each associated with a location-independent structured name. CCN data repository 110 can store the data objects in encrypted form, which prevents an untrusted entity from accessing the data objects directly from CCN data repository 110. To access the data, the requesting entity needs to provide an interest for the data to client device 102, at which point a trusted application on client device 102 processes the interest. The trusted application (e.g., a repository-managing application) can decrypt the data if the requesting entity is associated with a protected space for the requested data.

For example, when client device 102 receives an interest from web browser 106 (or any other application running on client device 102), or from a remote computing device, client device 102 can use a location-independent structured name from the interest to search for matching content items within CCN data repository 110. If a content item's structured name matches that of the interest's structured name and any additional selection criteria, client device 102 can obtain the content object from CCN data repository 110 to satisfy the interest from the requesting entity.

Network servers 114 can include computing devices coupled to network 112, and can process an interest from client device 102 to provide content items that satisfy the interest. In some embodiments, network servers 114 can include a content server 120 that hosts data and/or services that are accessible by client device 102, and can include a plurality of intermediate nodes that facilitate scaling the service to a plurality of client devices (e.g., intermediate node 116). One exemplary service includes a content catalogue, which provides a user interface that allows a user to navigate through structured information, for example, at an online merchandise catalogue, or at a media-streaming service.

In some embodiments, the structured catalogue can include a front page, which may present catalogue items that are popular across a plurality of end-users, and/or may present catalogue items that may be of interest to a user of client device 102. Also, a user can navigate through the structured catalogue, such as by selecting an image or hyperlink that corresponds to a catalogue item to view an information page for that catalogue item, or to consume the catalogue item itself (e.g., a movie, a song, an image, a game, etc.). The catalogue can correspond to digital content that can be consumed by the user on a computing device, such as a movie or video content, music or audio content, or images, software, executable code, source code, etc. The catalogue can also correspond to physical objects or merchandise, allowing the user to learn about these physical items and/or place an order for a desired item.

Content server 120 can include or be coupled to a storage device 122 that stores a CCN repository 124, which includes content objects for the catalogue's data. When content server 120 receives an interest (e.g., from client device 102 or from an intermediate node 116), content server 120 can use a location-independent structured name from the interest to search for matching content items within CCN repository 124. If at least a subset of a content item's structured name matches that of the interest's structured name, content server 120 can forward the content item across a network 118 and/or network 112 toward the requesting device. Similarly, intermediate node 116 can include or be coupled to a storage device that stores a CCN cache, which intermediate node 116 can use to satisfy an interest.

In some embodiments, content server 120 can use data stored in storage device 122 to recommend content objects to a remote device, such as to an intermediate node 116, or to client device 102. This content-item recommendation allows the remote device to pre-fetch these content items that may be of interest to a user in the near future. For example, storage device 122 can include historical interests 126 that have been received from a plurality of client devices, and interest metadata 128 for historical interests 126. When a user browses through a content catalogue, client device 102 and/or intermediate node 116 can obtain the content-object recommendation from content server 120 to pre-load a local cache with other content objects that may be of interest to the user in the near future. Content server 120 can generate the recommendation, using historical interests 126 and interest metadata 128, to recommend other content items that are correlated with the items currently being consumed by the user.

In some embodiments, intermediate node 116 can also generate a recommendation for client device 102, which can significantly increase the performance observed by a user at client device 102 when navigating through the catalogue or when consuming high-bitrate data streams. For example, a storage device for intermediate node 116 can also store a plurality of historical interests, and the interest metadata. When the user at client device 102 navigates to a catalogue page that presents information for a movie, client device 102 may disseminate an interest for a thumbnail image to display on the catalogue page. Intermediate node 116 may determine that this thumbnail image is highly correlated with the movie's video stream, by analyzing the historical interests and the interest metadata, and generates a recommendation that includes one or more content objects that make up a beginning portion of the video stream (e.g., a 1 minute video stream). This allows client device 102 to automatically pre-populate the local cache to improve the responsiveness of the user interface in case the local user decides to view the video stream. Intermediate node 116 does not need to know information about the content catalogue to generate the recommendation, given that intermediate node 116 dynamically identifies a set of historical interests correlated to a given interest, based on correlation patterns in the metadata for the historical interests.

In some embodiments, intermediate node 116 can generate a content-object recommendation for itself. For example, when intermediate node 116 receives an interest for a content item that may be satisfied locally or by content server 120, intermediate node 116 can analyze the historical interests and the interest metadata to predict which other interests may be received by intermediate node 116 in the near future. Intermediate node 116 can disseminate these interests to pre-fetch the corresponding content items from content server 120.

In some embodiments, intermediate node 116 can generate content recommendations for a local application by exploiting a naming convention for digital content, such as to use name elements of a content object's name to identify a segment of a data stream. For example, when intermediate node 116 receives a content object that is associated with a data collection or data stream, intermediate node 116 can analyze the content object to identify a naming convention associated with the data collection or data stream. The naming convention can include, for example, a sequence number associated with a data stream, a version number associated with a file, and/or a page number associated with an electronic document. Intermediate node 116 then derives location-independent names for one or more other content objects in the data collection, based on the received content object's name.

To pre-cache other content objects in the collection or data stream, intermediate node 116 disseminates interests for one or more of the derived names. When intermediate node 116 receives a content object that matches a derived name, intermediate node 116 stores the content object in a repository or caches the content object in a content cache. Intermediate node 116 can also generate a content recommendation that indicates one or more of the derived names, and can send the recommendation to another device that may need to store or cache the other content objects in the collection, such as a client device.

If the intermediate node 116 satisfies an interest for one or more segments in a stream, intermediate node 116 can prepopulate a local cache with at least a predetermined number of segments in the stream that follow the cached segments, or with the remainder of the stream.

In summary, intermediate node 116 and/or content server 120 can generate a content-object recommendation to recommend one or more content objects to pre-fetch for a data cache. This allows data to be pre-cached at intermediate node 116 or client device 102 before client device 102 disseminates an interest for this data, even when this data is not popular among a plurality of client devices. Hence, the data-caching system allows client device 102 to present unpopular content to a local user, with a streaming or download performance that resembles the client-perceived performance of popular content.

Generating a Content-Object Recommendation

Figure 2:
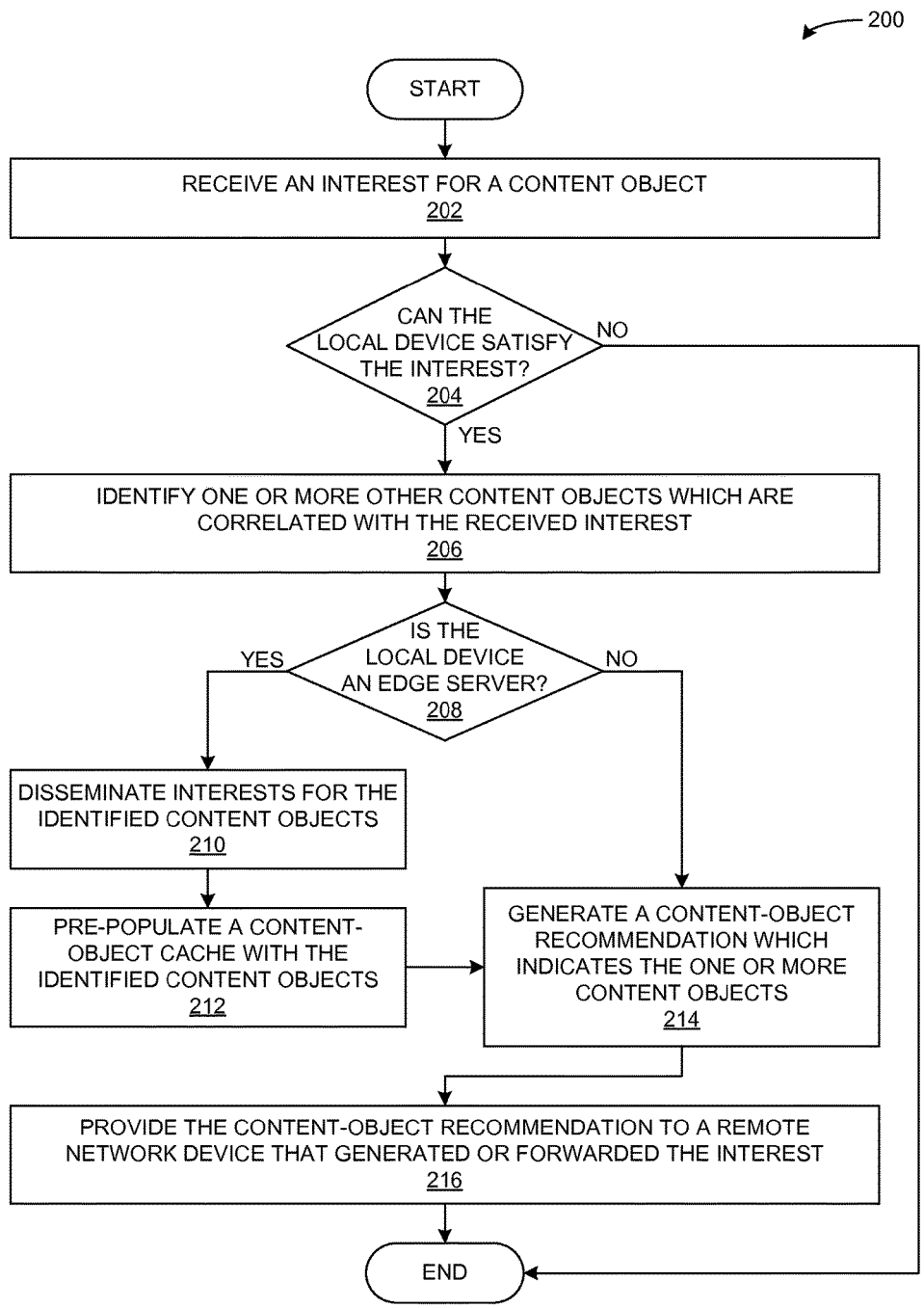
FIG. 2 presents a flow chart illustrating a method for generating and using a content-object recommendation in accordance with an embodiment.

FIG. 2 presents a flow chart illustrating a method 200 for generating and using a content-object recommendation in accordance with an embodiment. During operation, the system can receive an interest for a content object (operation 202), and determines whether the system can satisfy the interest (operation 204). For example, the system may be realized on a content server or an intermediate node, and determines whether the system's local repository stores a content object indicated by the interest. As another example, the system may be realized on an intermediate node, and determines whether the intermediate node is in a network path between a client device from which the interest originated, and a content server that satisfies the interest.

If the system determines that it can satisfy the interest, the system identifies one or more other content objects which are correlated with the received interest (operation 206). As mentioned above, the system can include a repository that stores a plurality of historical interests, and analyzes these interests to determine a correlation pattern to the interest requests. Two interests may have a high correlation with each other, for example, when they are oftentimes received within a predetermined time interval of each other, and/or when the two interests indicate content names with similar attributes.

Alternatively, the system can determine a correlated content object by following a content object's naming convention to derive names for other content objects in a collection. The system can analyze the content object's name using the naming convention to identify a sequence number associated with a data stream, a version number associated with a file, or any other naming attributes for identifying a content object in a collection. Then, the system can use the naming convention to modify the content object's name to generate a name for other correlated content objects in the collection.

In some embodiments, if the system is realized on an intermediate node (operation 208), the system can obtain the identified content objects to pre-populate a content cache. In doing so, the system can disseminate interests for the identified content objects (operation 210). When the system obtains the content objects that satisfy these interests, the system pre-populates the content cache with these content objects (operation 212).

In embodiments, the system can generate a content-object recommendation which indicates the other content objects that are determined to be correlated with the requested content object (operation 214). The system can provide the content-object recommendation to a remote network device that generated or forwarded the interest for the content object (operation 216). For example, an intermediate node can request an updated recommendation from a content server, and the content server can provide the recommendation to the intermediate node, which allows the intermediate node to pre-populate a local content cache. As another example, a client device can obtain the recommendation from the intermediate node, or the content server, which the client device can use to obtain other content objects that are likely to be of interest to the client device in the near future. Finally, the client application may use the recommendations to prepopulate the local cache or content repository.

Figure 3:
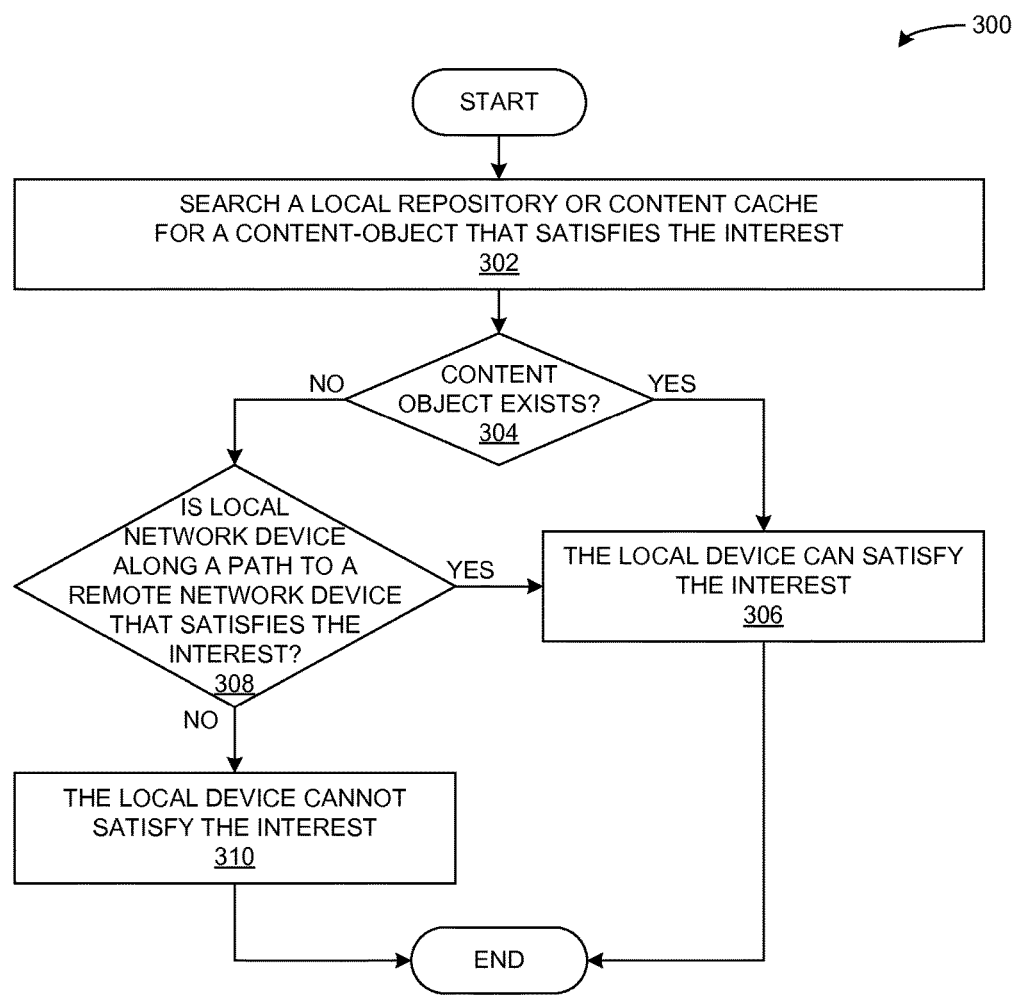
FIG. 3 presents a flow chart illustrating a method for determining whether an intermediate server can satisfy an interest for content in accordance with an embodiment.

FIG. 3 presents a flow chart illustrating a method 300 for determining whether an intermediate node can satisfy an interest for content in accordance with an embodiment. In some embodiments, the system can search a local repository and/or a content cache for a content-object that satisfies the interest (operation 302), and determines whether the content object exists in the repository (operation 304). If so, the system determines that the local device can satisfy the interest (operation 306).

However, if the content object does not exist in the local repository or cache, the system determines whether the local network device is along a path to a remote network device that satisfies the interest (operation 308). For example, during operation 308, the system can perform a lookup operation on a forwarding information base (FIB) to determine whether an entry exists for the interest. As another example, the system can wait to obtain the content object that satisfies the interest, from the remote network device, which then allows the local device to satisfy the interest. Hence, if the local device is along a path between the remote device that can satisfy the interest and the content consumer, the system determines that the local device itself can satisfy the interest (operation 306). Otherwise, the local device itself cannot satisfy the interest (operation 310).

Computing Correlation Values

The data-caching system can periodically compute correlation values between pairs of historical interests, based on attributes for these interests. This way, as usage patterns change across certain web pages or catalogue entries, the system can dynamically reflect these changing patterns in the recent correlation values for the content objects that make up these web pages or catalogue entries. The system can use these correlation values to recommend content objects for a given interest.

In some embodiments, the system does not know which client device disseminated each interest, which makes it difficult for the system to correlate interests when they are received from the same client device. Each intermediate node may receive interests from many clients, such that the different clients are requesting disparate content most of the time. However, interests for related content will oftentimes be disseminated within a short time interval of each other. Hence, the system can compute a correlation value for a pair of interests using a statistical analysis of the historical interests' timestamps, and assigns a higher correlation value to pairs of interests that are oftentimes received within a threshold time interval of each other. The system can also compute the correlation value by analyzing the interests' structured names, for example, to determine which pairs of interests are likely to be correlated based on a common name prefix. This way, pairs of interests with a higher correlation value correspond to interests for related content.

In some embodiments, an intermediate node can analyze historical interests from a local repository, as well as historical interests from other intermediate nodes, and/or from one or more content servers. Doing so allows each intermediate node to deduce more user behavior patterns from the historical interests, which allows the intermediate node to achieve a higher accuracy in the correlation values between pairs of interests.

Figure 4:
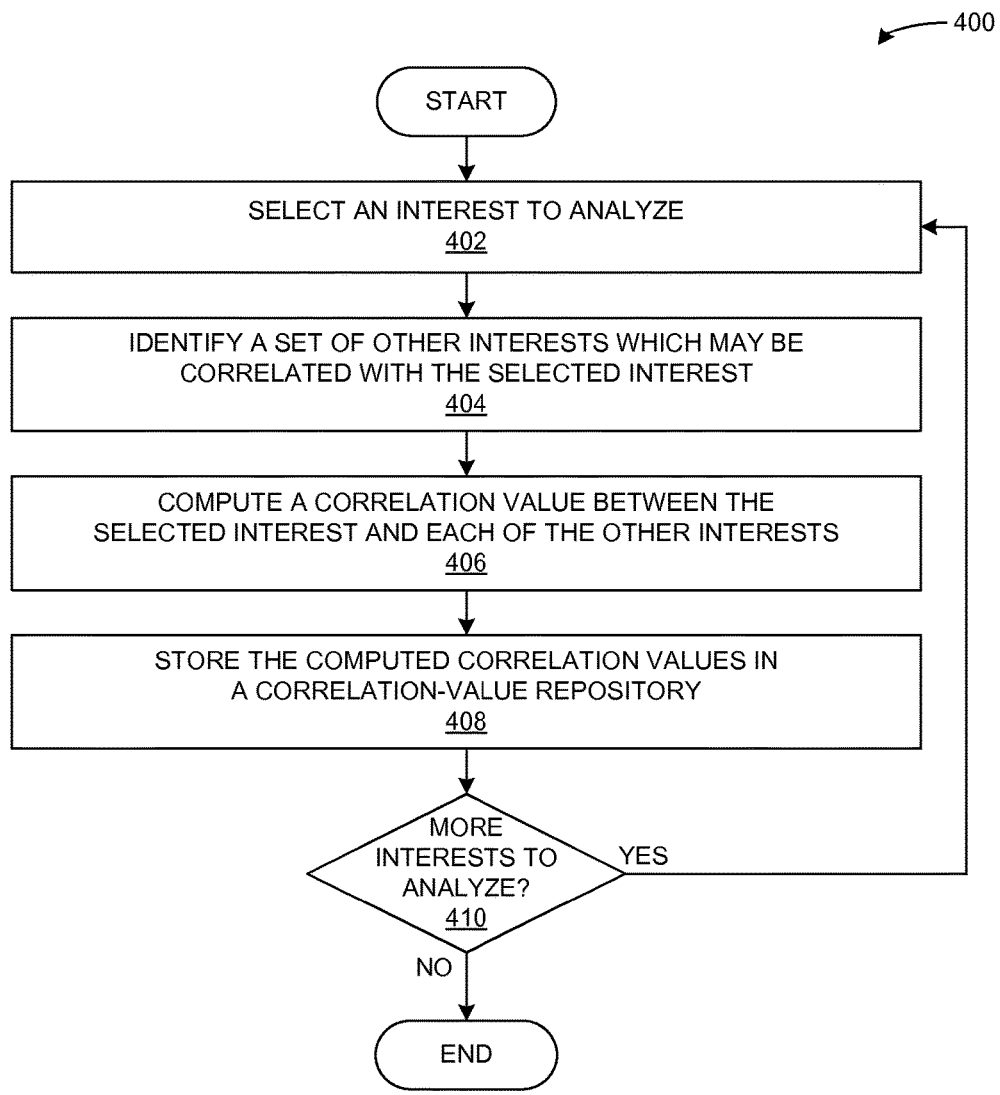
FIG. 4 presents a flow chart illustrating a method for computing correlation values between pairs of interests or content objects in accordance with an embodiment.

FIG. 4 presents a flow chart illustrating a method 400 for computing correlation values between pairs of interests or content objects in accordance with an embodiment. During operation, the system can select an interest to analyze (operation 402), and identifies a set of other interests that may be correlated with the selected interest (operation 404). The system can select the interest from a collection of historical interests (e.g., to determine new correlations for an existing interest), or can select the interest from a set of new interests that have been received recently from a client device. Also, during operation 404, the system can filter the collection of historical interests to identify other interests with attributes that satisfy interest-correlating criteria. In some embodiments, the interest-correlating criteria may include one or more of: a timestamp; a time interval; a naming attribute (e.g., an HSVLI name prefix); and/or a user rating (e.g., a user rating for a catalogue item).

The system then computes correlation values between the selected interest and each of the other interests, based on the interest-correlating criteria (operation 406). The system stores each computed correlation value in a correlation-value repository (e.g., a database), in association with the selected interest and the other interest (operation 408). The system then determines whether there are more interests to analyze (operation 410), and if so, returns to operation 402 to select another interest.

Client Device

In some embodiments, a client device maintains a content-object cache to store content objects that may be of interest to a local application or the local user in the near future, regardless of whether they are popular content objects. For example, the client device may include an application that presents a content catalogue to a local user, such as a native application, or a web page presented by a web browser. The user can browse through this catalogue (e.g., a movie or video listing, an online-merchant catalogue, search results from an Internet search engine, a web page including links, etc.), and can select entries (e.g., a web link) to view content associated with the selected entry.

However, when a user browses through unpopular content, the user oftentimes experiences latency in the user interface while the client device obtains the unpopular content from a content server. This is because a network's intermediate nodes typically maintain a data cache to store popular data that is frequently requested by many client devices, and avoid storing content that is not likely to be requested by many client devices. When a client device submits a request for unpopular data, it is likely that the intermediate node may need to forward the request to a content server. To make matters worse, the content server also may not have stored the requested data in a fast-access data cache (e.g., in a memory-based cache, or at a high-bandwidth storage device), and may need to obtain the data item from a low-bandwidth storage device.

In some embodiments of the present invention, the client device can receive a content-object recommendation which indicates unpopular content objects that are relevant to the local client device. This allows the client device to submit an interest for these unpopular content objects, before any application running on the client device submits a request for this unpopular content object.

Figure 5:
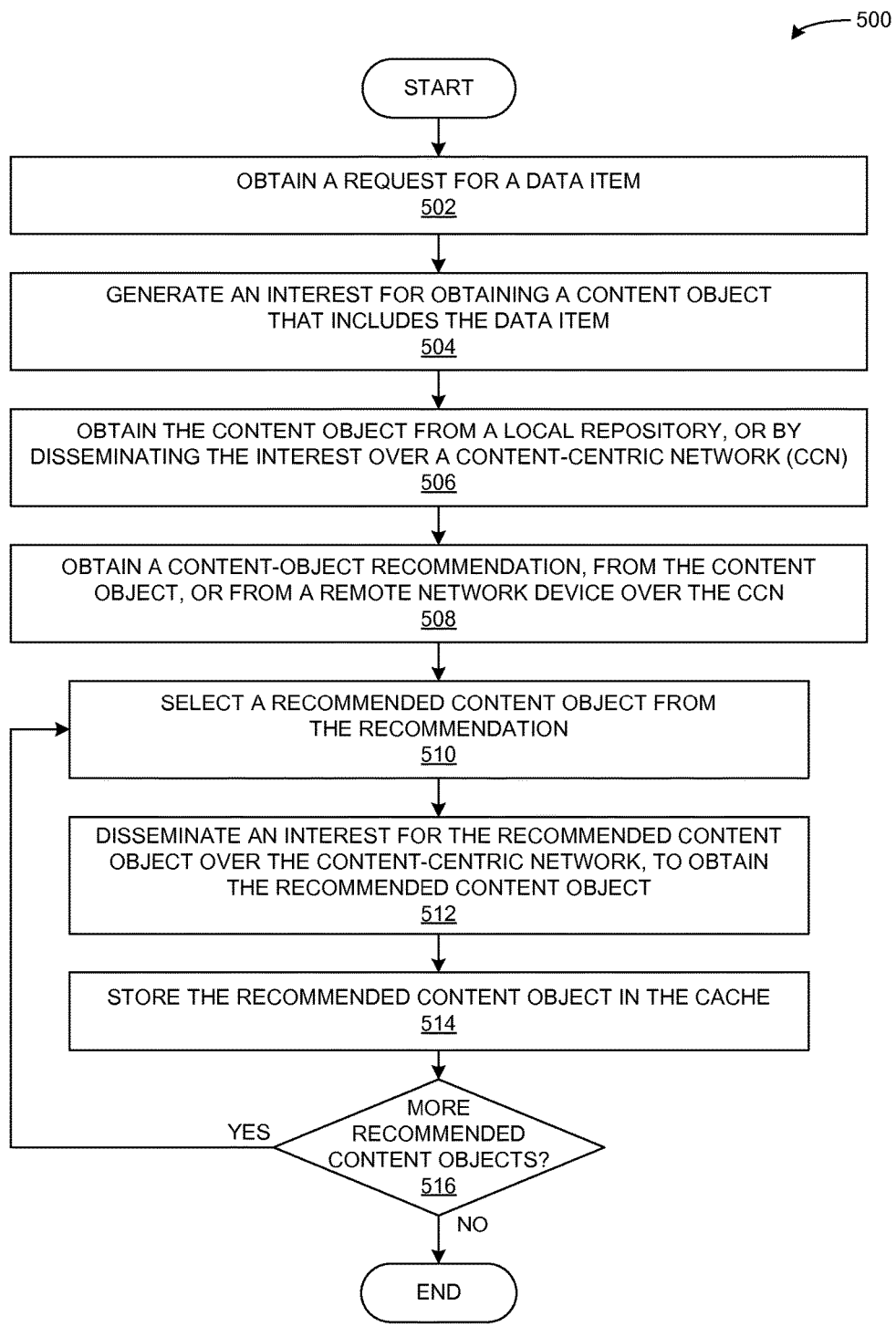
FIG. 5 presents a flow chart illustrating a method for pre-loading a content-object cache using a content-object recommendation in accordance with an embodiment.

FIG. 5 presents a flow chart illustrating a method 500 for pre-loading a content-object cache using a content-object recommendation in accordance with an embodiment. During operation, the system can obtain a request for a content item (operation 502), such as from a local application that presents a content catalogue to a user. The local application can include a Web browser that displays web pages to a local user, or can include a native application that presents a predetermined content catalogue to a local user (e.g., a movie-streaming application running on an Internet-enabled television, or running on a portable computing device).

The system then generates an interest for obtaining a content object that includes the data item (operation 504), and obtains the content object based on the interest (operation 506). The system can obtain the content object from a local repository, or by disseminating the interest over a content-centric network. In some embodiments, the content object can include the complete data item, such as an image, text, an executable object, etc. In some other embodiments, the data item may be large, and may be transferred through a series of content objects. Hence, during operation 506, the system may obtain the first content object in the series, such that the first content object can indicate how the data item has been segmented into the series of content objects (e.g., indicating the number of content objects in the series). The system can obtain the remainder of the content objects by disseminating interests for each of the other content objects in the series.

In some embodiments, the system can pre-populate a local cache with other content objects that are correlated with the received content object by obtaining a content-object recommendation (operation 508). For example, the system can obtain the content-object recommendation from the received content object itself, or from a remote network device that generated or forwarded the content object for the local client device. The content-object recommendation can indicate location-independent names for a set of other content objects that are correlated to the received content object, or can indicate interests that facilitate obtaining these content objects.

To pre-populate the cache, the system selects a recommended content object from the recommendation (operation 510), and disseminates an interest for the recommended content object (operation 512). Once the system has obtained the recommended content object, the system proceeds to store the recommended content object in the local cache (operation 514). This allows the system to obtain the recommended content object from the cache if a local application submits a request for this content object in the near future, without having to disseminate an interest for the object over a content-centric network.

The system can also determine whether there are more recommended content objects in the recommendation (operation 516), and if so, returns to operation 510 to obtain and cache another recommended object. In some embodiments, the system can return to operation 510 to select another recommended content object before receiving and caching a previous content object (before completing operation 514). Hence, the system can disseminate interests for a plurality of recommended content objects, and caches these recommended content objects as they are received via the content-centric network. Intermediate nodes may choose to pass the content along the return path without caching the content to avoid evicting popular content for the unpopular content. The content may be cached at the requesting client to prepopulate a local cache or local repository. These requests may be logged and stored to create new correlations and potential caching opportunities in the future.

Figure 6A:
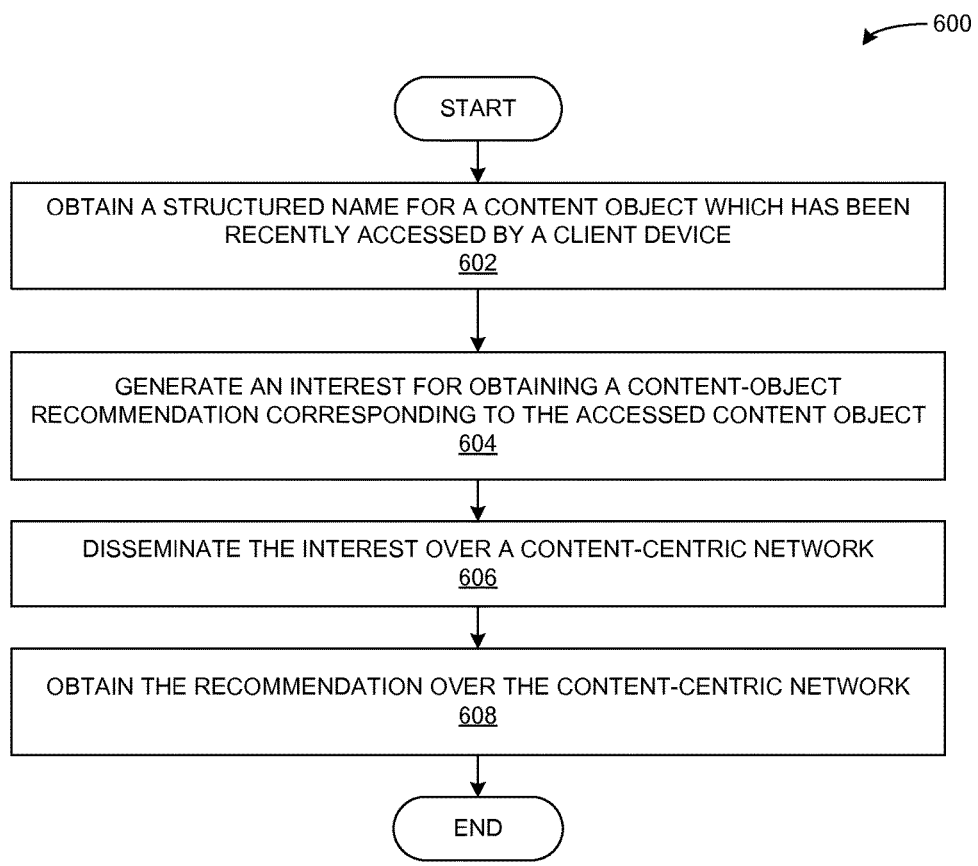
FIG. 6A presents a flow chart illustrating a method for requesting a content-object recommendation that indicates other content objects that may be of interest to a client device in accordance with an embodiment.

FIG. 6A presents a flow chart illustrating a method 600 for requesting a content-object recommendation that indicates other content objects that may be of interest to a client device in accordance with an embodiment. During operation, the system can obtain a structured name for a content object which has been recently accessed by the client device (operation 602), such as for a content object which the client device has obtained over a content-centric network, or from a local content-object repository or cache. The system then generates an interest for obtaining a content-object recommendation, which corresponds to the accessed content object (operation 604), and disseminates the interest over a content-centric network (operation 606).

In some embodiments, the system can generate the recommendation by including the content object's name in the interest's structured name. For example, if the accessed content object has a structured name "/PARC/Videos/A-C/alpha_thumbnail.jpg," the system can generate an interest "/PARC/Videos/A-C/alpha_thumbnail.jpg/_recommendation" to request a content-object recommendation from a content server that stores the image "alpha_thumbnail.jpg," and/or from any intermediate node along a network path between the client device and the content server. In this example, when the user views the thumbnail picture that corresponds to a video named "alpha," the content server or the intermediate node can recommend content objects for data presented to the user when the user views the catalog entry "Alpha." This data can include a web page for the video named "Alpha," or can include a beginning portion of the video named "Alpha."

Once the system disseminates the interest for the content-object recommendation, the system can obtain this recommendation over the content-centric network (operation 608), such as from a content server that can satisfy the interest for "/PARC/Videos/A-C/alpha_thumbnail.jpg," or from any intermediate node along the path between the client device and the content server.

Figure 6B:
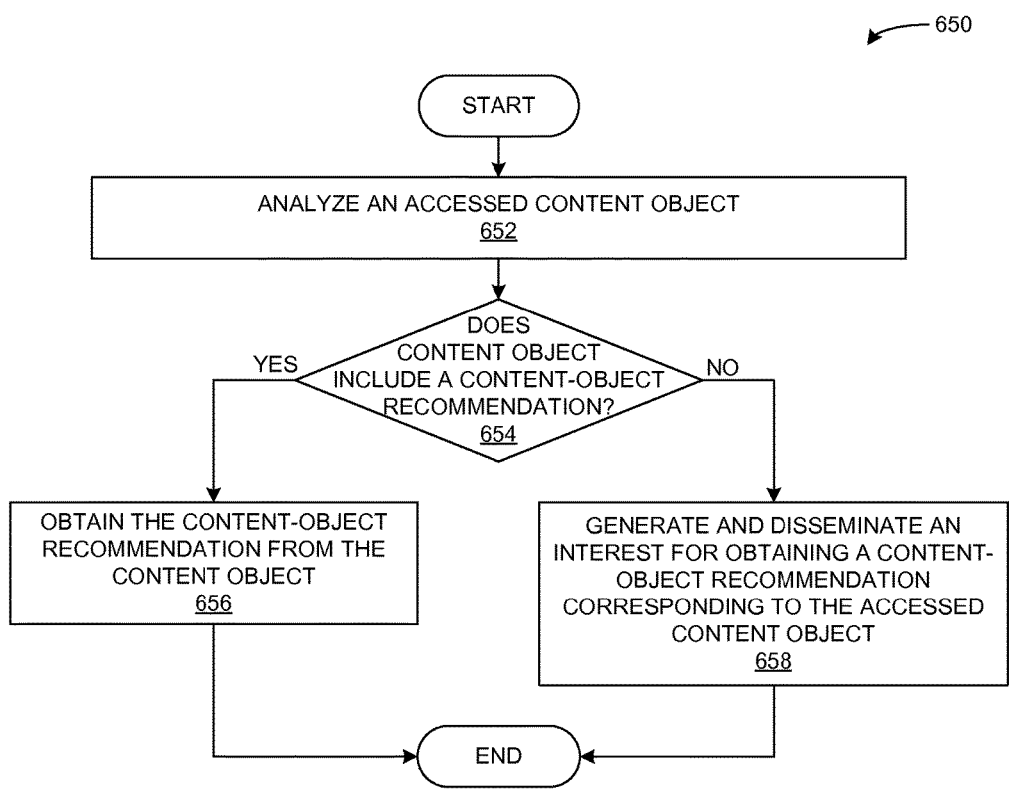
FIG. 6B presents a flow chart illustrating a method for obtaining a content-object recommendation corresponding to a previously accessed content object in accordance with an embodiment.

FIG. 6B presents a flow chart illustrating a method 650 for obtaining a content-object recommendation corresponding to a previously accessed content object in accordance with an embodiment. During operation, the system can analyze the accessed content object (operation 652), and determines whether the accessed content object includes a content-object recommendation (operation 654). If so, the system obtains the content-object recommendation from the content object (operation 656). Otherwise, the system obtains the content-object recommendation by generating and disseminating an interest for a recommendation that corresponds to the accessed content object (operation 658).

Figure 7:
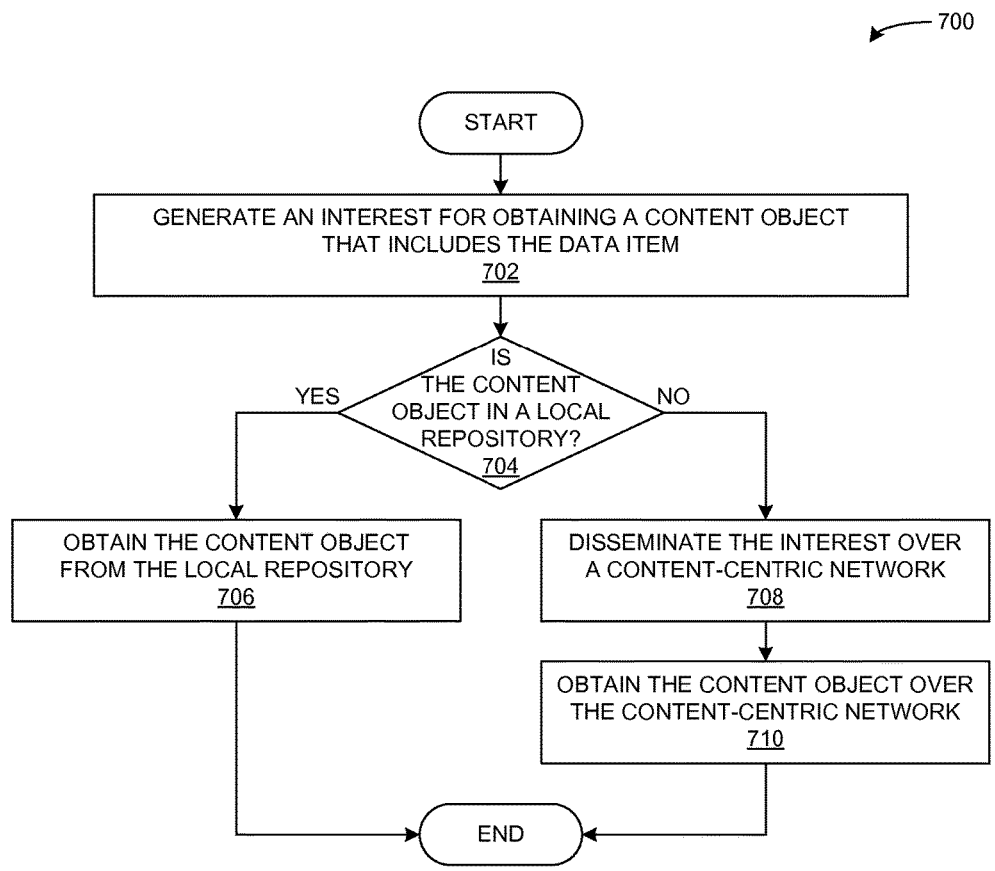
FIG. 7 presents a flow chart illustrating a method for processing an interest in accordance with an embodiment.

FIG. 7 presents a flow chart illustrating a method 700 for processing an interest in accordance with an embodiment. During operation, the system generates an interest for obtaining a content object that includes a requested data item (operation 702), and determines whether the content object exists in a local repository or cache (operation 704). If so, the system obtains the content object from the local repository (operation 706).

However, if the content object is not stored in a local repository or cache, the system disseminates the interest over a content-centric network (operation 708). The system then obtains the content object, which satisfies the interest, over the content-centric network (operation 710).

Figure 8:
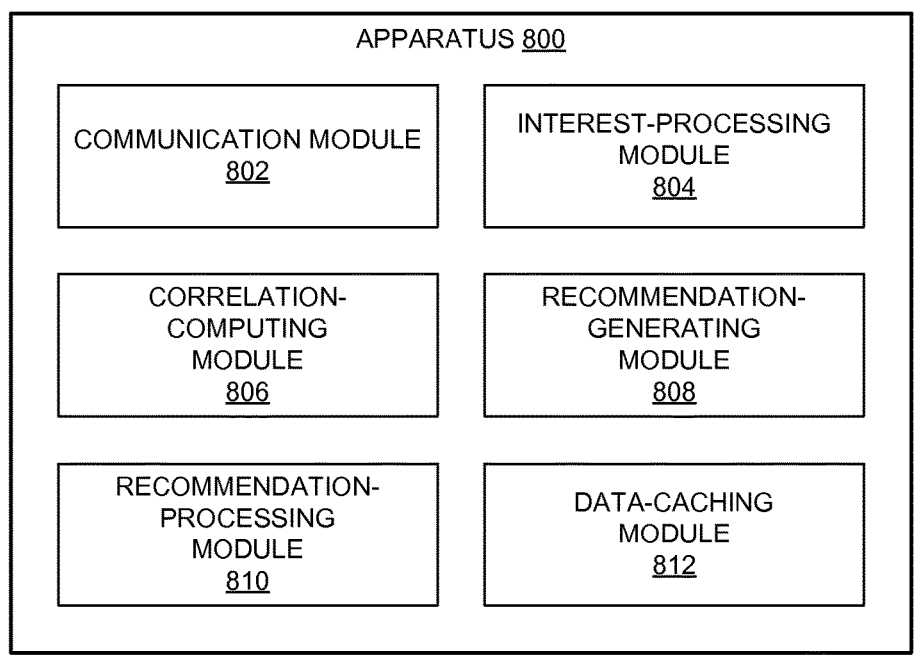
FIG. 8 illustrates an exemplary apparatus that facilitates pre-loading a content-object cache in accordance with an embodiment.

FIG. 8 illustrates an exemplary apparatus 800 that facilitates pre-loading a content-object cache in accordance with an embodiment. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated in a computer system, or realized as a separate device which is capable of communicating with other computer systems and/or devices. Specifically, apparatus 800 can comprise a communication module 802, an interest-processing module 804, a correlation-computing module 806, a recommendation-generating module 808, a recommendation-processing module 810, and a data-caching module 812.

In some embodiments, communication module 802 can receive an interest for a content object, can return the content object, and/or can send a content recommendation to a client device. Interest-processing module 804 can process an interest to determine whether the local device can satisfy the interest, and if so, can configure communication module 802 to return a content object that satisfies the interest. Correlation-computing module 806 can periodically analyze historical interests, corresponding to a set of content objects requested by a plurality of client devices, to compute a correlation value between pairs of content objects in the set. Recommendation-generating module 808 can generate a content recommendation that indicates one or more other content objects correlated to an interest's content object.

In some embodiments, communication module 802 can disseminate a first interest for a first content object. Further, recommendation-processing module 810 can obtain a content recommendation indicating at least a second content object correlated with the first content object, and communication module 802 can send a second interest for the second content object. Data-caching module 812 can then cache the second content object once communication module 802 receives the second content object that satisfies the second interest.

Figure 9:
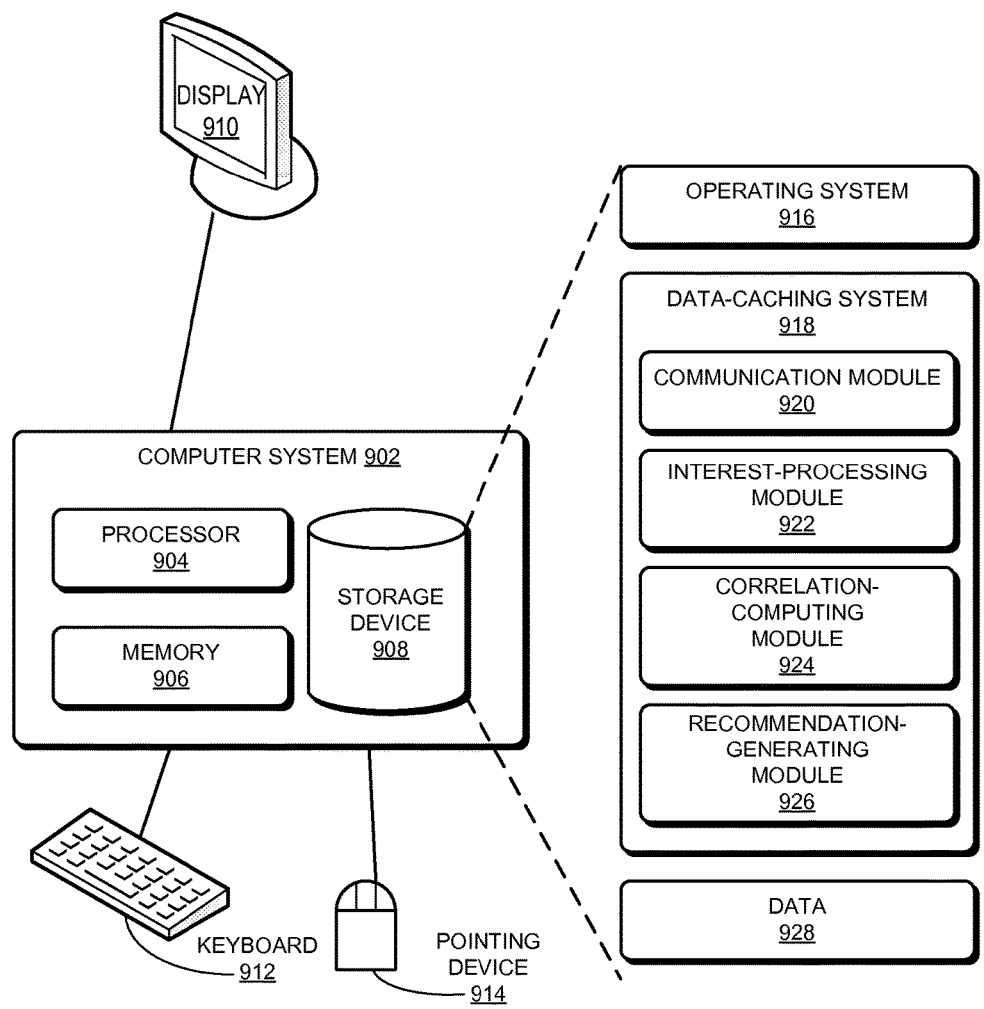
FIG. 9 illustrates an exemplary computer system that facilitates pre-loading a content-object cache in accordance with an embodiment.

FIG. 9 illustrates an exemplary computer system 902 that facilitates pre-loading a content-object cache in accordance with an embodiment. Computer system 902 includes a processor 904, a memory 906, and a storage device 908. Memory 906 can include a volatile memory (e.g., RAM) that serves as a managed memory, and can be used to store one or more memory pools. Furthermore, computer system 902 can be coupled to a display device 910, a keyboard 912, and a pointing device 914. Storage device 908 can store operating system 916, data-caching system 918, and data 928.

Data-caching system 918 can include instructions, which when executed by computer system 902, can cause computer system 902 to perform methods and/or processes described in this disclosure. Specifically, data-caching system 918 may include instructions for receiving an interest for a content object, returning the content object, and/or sending a content recommendation to a client device (communication module 920). Further, data-caching system 918 can include instructions for processing an interest to determine whether the local device can satisfy the interest, and if so, returning a content object that satisfies the interest (interest-processing module 922).

Data-caching system 918 can also include instructions for periodically analyzing historical interests, corresponding to a set of content objects requested by a plurality of client devices, to compute a correlation value between pairs of content objects in the set (correlation-computing module 924), and can include instructions for generating a content recommendation that indicates one or more other content objects correlated to an interest's content object (recommendation-generating module 926). Data 928 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
receiving, by an intermediate network node of a content-centric network (CCN), an interest for a content object requested by a client device;
determining, based on a lookup operation on a forwarding information base (FIB) data structure, that the intermediate network node is along a path from the client device to a remote device that can satisfy the interest;
determining one or more other content objects that are correlated with the content object and accessible via the CCN by:
identifying a hierarchically-structured variable length identifier (HSVLI) associated with the content object; and
deriving, from the HSVLI, location-independent names within the CCN for the one or more other content objects;
obtaining the content object;
obtaining a content recommendation that includes the location-independent names of the one or more other content objects;
encapsulating the content recommendation with the content object to generate a recommendation-carrying content object; and
sending the recommendation-carrying content object to the client device to cause the client device to automatically pre-populate a local cache at the client device.

2. The method of claim 1, wherein the interest corresponds to data presented by an interactive menu or catalogue, and the content recommendation indicates a content object obtainable by following a link or menu item of the interactive menu or catalogue.

3. The method of claim 1, wherein the determining of the other content objects further comprises:
disseminating, by the intermediate network node, a recommendation-requesting interest within the CCN, wherein the recommendation-requesting interest is identified by the HSVLI; and
receiving, in response to the disseminating, the location-independent names from a second remote node.

4. The method of claim 1, further comprising:
periodically analyzing historical interests, corresponding to a set of content objects requested by a plurality of client devices, to compute a correlation value between pairs of content objects in the set.

5. The method of claim 4, wherein the determining the one or more other content objects correlated with the content object further comprises:
selecting, from the set of content objects, a subset of content objects that have a correlation value greater than or equal to a threshold correlation value.

6. The method of claim 1, further comprising:
determining that the intermediate network node stores the content object.

7. The method of claim 1, wherein the deriving is further based on correlations between the data objects, the correlations being based on one or more of the following matching attributes:
a timestamp;
a time interval; and
a user rating.

8. The method of claim 1, wherein the one or more matching attributes include a correlation pattern.

9. A non-transitory computer-readable storage medium storing instructions that, when executed by an intermediate network node of a content-centric network (CCN), cause the computer to perform a method, the method comprising:
receiving an interest for a content object requested by a client device;
determining, based on a lookup operation on a forwarding information base (FIB) data structure, that the intermediate network node is along a path from the client device to a remote device that can satisfy the interest;
determining one or more other content objects that are correlated with the content object and accessible via the CCN by:
identifying a hierarchically-structured variable length identifier (HSVLI) associated with the content object; and
deriving, from the HSVLI, location-independent names within the CCN for the one or more other content objects;
obtaining the content object;
obtaining a content recommendation that includes the location-independent names of the one or more other content objects;
encapsulating the content recommendation with the content object to generate a recommendation-carrying content object; and
sending the recommendation-carrying content object to the client device to cause the client device to automatically pre-populate a local cache at the client device.

10. The storage medium of claim 9, wherein the interest corresponds to data presented by an interactive menu or catalogue, and the content recommendation indicates a content object obtainable by following a link or menu item of the interactive menu or catalogue.

11. The storage medium of claim 9, wherein the determining of the other content objects further comprises:
disseminating, by the intermediate network node, a recommendation-requesting interest within the CCN, wherein the recommendation-requesting interest is identified by the HSVLI; and
receiving, in response to the disseminating, the location-independent names from a second remote node.

12. The storage medium of claim 9, the method further comprising:
periodically analyzing historical interests, corresponding to a set of content objects requested by a plurality of client devices, to compute a correlation value between pairs of content objects in the set.

13. The storage medium of claim 12, wherein the determining the one or more other content objects correlated with the content object further comprises:
selecting, from the set of content objects, a subset of content objects that have a correlation value greater than or equal to a threshold correlation value.

14. The storage medium of claim 9, wherein the deriving is further based on correlations between the data objects, the correlations being based on one or more of the following matching attributes:
a timestamp;
a time interval; and
a user rating.

15. The storage medium of claim 14, wherein the one or more matching attributes include a correlation pattern.

16. A computer-implemented method, comprising:
responsive to receiving a first content object, identifying a hierarchically-structured variable length identifier (HSVLI) associated with the first content object;

deriving, from the HSVLI, location-independent names within the content-centric network (CCN) for one or more other content objects that are correlated with the first content object;

disseminating, by a computing device, a first interest for the first content object within the CCN;

generating a content recommendation indicating at least a particular location-independent name for a second content object of the one or more other content objects;

sending a second interest within the CCN for the second content object; and responsive to receiving the second content object that satisfies the second interest, storing or caching the second content object in a local repository or content cache associated with the computing device to automatically prepopulate the local repository or the content cache associated with the computing device.

17. The method of claim 16, wherein the first interest corresponds to data presented by an interactive menu or catalogue, and the content recommendation indicates a content object obtainable by following a link or menu item of the interactive menu or catalogue.

18. The method of claim 16, wherein the HSVLI includes one or more of:

a sequence number associated with a data stream;
a version number associated with a file; and
a page number associated with an electronic document.

19. An apparatus, comprising a processor and a memory storing instructions that, when executed by the processor, cause the apparatus to:

identify a hierarchically-structured variable length identifier (HSVLI) associated with a first content object;

derive, from the HSVLI, location-independent names within the content-centric network (CCN) for one or more other content objects that are correlated with the first content object;

disseminate a first interest within the CCN for the first content object;

generate a content recommendation indicating at least a particular location-independent name for a second content object of the one or more other content objects;

send a second interest for the second content object; and store or cache the second content object in a local repository or content cache, responsive to the communication module receiving the second content object that satisfies the second interest, to automatically prepopulate the local repository or the content cache.

* * * * *